United States Patent
Golebiowski et al.

(10) Patent No.: US 12,425,274 B2
(45) Date of Patent: Sep. 23, 2025

(54) EQUALIZER COEFFICIENTS FOR ERROR VECTOR MAGNITUDE MEASUREMENT IN NEW RADIO BASE STATION CONFORMANCE TESTING

(71) Applicant: Nokia Solutions and Networks Oy, Espoo (FI)

(72) Inventors: Bartlomiej Golebiowski, Olesnica (PL); Tomasz Wojciechowski, Wroclaw (PL); Man Hung Ng, Swindon (GB)

(73) Assignee: Nokia Solutions and Networks Oy, Espoo (FI)

( * ) Notice: Subject to any disclaimer, the term of this patent is extended or adjusted under 35 U.S.C. 154(b) by 280 days.

(21) Appl. No.: 17/998,466

(22) PCT Filed: May 3, 2021

(86) PCT No.: PCT/EP2021/061526
§ 371 (c)(1),
(2) Date: Nov. 10, 2022

(87) PCT Pub. No.: WO2021/228599
PCT Pub. Date: Nov. 18, 2021

(65) Prior Publication Data
US 2023/0179450 A1    Jun. 8, 2023

Related U.S. Application Data

(60) Provisional application No. 63/025,795, filed on May 15, 2020.

(51) Int. Cl.
*H04L 25/02* (2006.01)
*H04L 5/00* (2006.01)
(Continued)

(52) U.S. Cl.
CPC ........ *H04L 25/0232* (2013.01); *H04L 5/0051* (2013.01); *H04L 25/03159* (2013.01); *H04L 47/27* (2013.01)

(58) Field of Classification Search
None
See application file for complete search history.

(56) References Cited

U.S. PATENT DOCUMENTS

2014/0169280 A1\* 6/2014 Yu ................. H04L 27/2662
370/329
2015/0009948 A1  1/2015 Raaf et al.
(Continued)

FOREIGN PATENT DOCUMENTS

CN    103703833 A    4/2014
CN    107294678 A    10/2017
(Continued)

OTHER PUBLICATIONS

"3rd Generation Partnership Project; Technical Specification Group Radio Access Network; NR; Base Station (BS) radio transmission and reception (Release 16)", 3GPP TS 38.104, V16.3.0, Mar. 2020, pp. 1-258.

(Continued)

*Primary Examiner* — Duc T Duong
(74) *Attorney, Agent, or Firm* — Harness, Dickey & Pierce, P.L.C.

(57) ABSTRACT

According to a first embodiment, a method may include calculating at least one moving average window size in a frequency domain associated with a channel bandwidth and adjusting the at least one moving average window size in the frequency domain for at least one demodulation reference signal subcarrier in at least one resource block where at least one gap having a size of at least a predefined size is between the at least one resource block. The at least one resource (Continued)

block comprises a predetermined number of demodulation reference signal subcarriers.

15 Claims, 9 Drawing Sheets

(51) Int. Cl.
  *H04L 5/02*      (2006.01)
  *H04L 25/03*     (2006.01)
  *H04L 47/27*     (2022.01)

(56) References Cited

U.S. PATENT DOCUMENTS

| | | | | |
|---|---|---|---|---|
| 2016/0173152 | A1* | 6/2016 | Rahman | H04J 11/0036 455/63.1 |
| 2017/0201361 | A1* | 7/2017 | Xu | H04L 5/0023 |
| 2018/0331803 | A1* | 11/2018 | Wang | H04W 52/281 |
| 2019/0357248 | A1 | 11/2019 | Takeda et al. | |
| 2021/0044981 | A1* | 2/2021 | Bhattad | H04J 13/0003 |

FOREIGN PATENT DOCUMENTS

| | | |
|---|---|---|
| CN | 109391403 A | 2/2019 |
| CN | 110999185 A | 4/2020 |
| WO | 2018164495 A1 | 9/2018 |

OTHER PUBLICATIONS

"3rd Generation Partnership Project; Technical Specification Group Radio Access Network; NR; Base Station (BS) conformance testing Part 1: Conducted conformance testing (Release 16)", 3GPP TS 38.141-1, V16.3.0, Mar. 2020, pp. 1-241.
"3rd Generation Partnership Project; Technical Specification Group Radio Access Network; NR; Base Station (BS) conformance testing Part 2: Radiated conformance testing (Release 16)", 3GPP TS 38.141-2, V16.3.0, Mar. 2020, pp. 1-301.
"Clarification on EVM equalizer calculation for NR BS conformance testing", 3GPP TSG-RAN WG4 Meeting #94-e-Bis, R4-2003485, Agenda: 4.7.1, Keysight Technologies, Apr. 20-30, 2020, 3 pages.
"3rd Generation Partnership Project; Technical Specification Group Radio Access Network; Evolved Universal Terrestrial Radio Access (E-UTRA); Base Station (BS) conformance testing (Release 16)", 3GPP TS 36.141, V16.5.0, Mar. 2020, pp. 1-504.
"WF on EVM equalizer calculation for NR", 3GPP TSG-RAN WG4 Meeting #94-e-Bis, R4-2005604, Agenda: 4.7.1, Keysight Technologies, Apr. 20-30, 2020, 2 pages.
International Search Report and Written Opinion received for corresponding Patent Cooperation Treaty Application No. PCT/EP2021/061526, dated Jul. 27, 2021, 13 pages.
"Email discussion summary for RAN4#94e Bis#202 NR New RAT Conformance BS Part", 3GPP TSG-RAN WG4 Meeting # 94-e-Bis, R4-2005577, Agenda: 4.7, ZTE Corporation, Apr. 20-30, 2020, 40 pages.
"WF on DM-RS windowing for TM2", 3GPP TSG-RAN WG4 Meeting #95-e, R4-2008739, Agenda: 4.7.1, Keysight Technologies, May 20-Jun. 5, 2020, 3 pages.
"Further Analysis on EVM equalizer frequency domain calculation for NR BS conformance testing", 3GPP TSG-RAN WG4 Meeting #96-e, R4-2011291, Agenda: 4.5.1, Keysight Technologies, Aug. 17-28, 2020, 6 pages.
"Discussion on EVM equalization for NR BS", 3GPP TSG-RAN WG4 Meeting #95-e, R4-2007481, Agenda: 4.7.1, Nokia, May 25-Jun. 5, 2020, 3 pages.
Office action received for corresponding Indian Patent Application No. 202247072523, dated Feb. 8, 2023, 7 pages.
Office action received for corresponding European Patent Application No. 21723229.7, dated Feb. 12, 2025, 5 pages.
CMCC,R1-1700438 "Phase-tracking reference signal design for high-frequency systems", Jan. 9, 2017. pp. 1-15.
Office Action issued in corresponding Chinese Patent Application No. 202180060965.8, dated Apr. 14, 2025.

* cited by examiner

FIG. 6

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   |   |   | ■ |   |   |   |   |   |   |    | ■  |    |    |
|   |   |   |   |   |   |   |   |   |   |    |    |    |    |
|   |   |   | ■ |   |   |   |   |   |   |    | ■  |    |    |
|   |   |   | ■ |   |   |   |   |   |   |    | ■  |    |    |
|   |   |   |   |   |   |   |   |   |   |    |    |    |    |
|   |   |   | ■ |   |   |   |   |   |   |    | ■  |    |    |
|   |   |   |   |   |   |   |   |   |   |    |    |    |    |
|   |   |   | ■ |   |   |   |   |   |   |    | ■  |    |    |
|   |   |   | ■ |   |   |   |   |   |   |    | ■  |    |    |

EQUALIZER COEFFICIENTS FOR ERROR VECTOR MAGNITUDE MEASUREMENT IN NEW RADIO BASE STATION CONFORMANCE TESTING

This application was originally filed as PCT Application No. PCT/EP2021/061526, filed on May 3, 2021, which claims priority from U.S. Provisional Application No. 63/025,795, filed on May 15, 2020, each of which is incorporated herein by reference in its entirety.

FIELD

Some example embodiments may generally relate to mobile or wireless telecommunication systems, such as Long Term Evolution (LTE), fifth generation (5G) radio access technology (RAT), new radio (NR) access technology, or other communications systems. For example, certain embodiments may relate to systems and/or methods for maximizing moving average window sizes.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is expected that NR can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). The next generation radio access network (NG-RAN) represents the RAN for 5G, which can provide both NR and LTE (and LTE-Advanced) radio accesses. It is noted that, in 5G, the nodes that provide radio access functionality to a user equipment (i.e., similar to the Node B in UTRAN or the evolved Node B (eNB) in LTE) may be named next-generation Node B (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein:

FIG. 6 illustrates an example of a demodulation reference signal (DMRS) pattern for physical downlink shared channel (PDSCH) EVM measurements in FR.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for optimizing aggregated feedback frequencies is not intended to limit the scope of certain embodiments, but is instead representative of selected example embodiments.

Third Generation Partnership Project (3GPP) Radio Access Network Working Group 4 (RAN4) considered EVM equalizer calculations for NR base station (BS) conformance testing. In general, 3GPP technical specification (TS) 38.104, 38.141 1, and 38.141-2 describe measurement and calculation details. These descriptions are based on TS 36.141 for E-UTRA signals, and modifications have made for adaptation into NR specifications.

Figure 1:
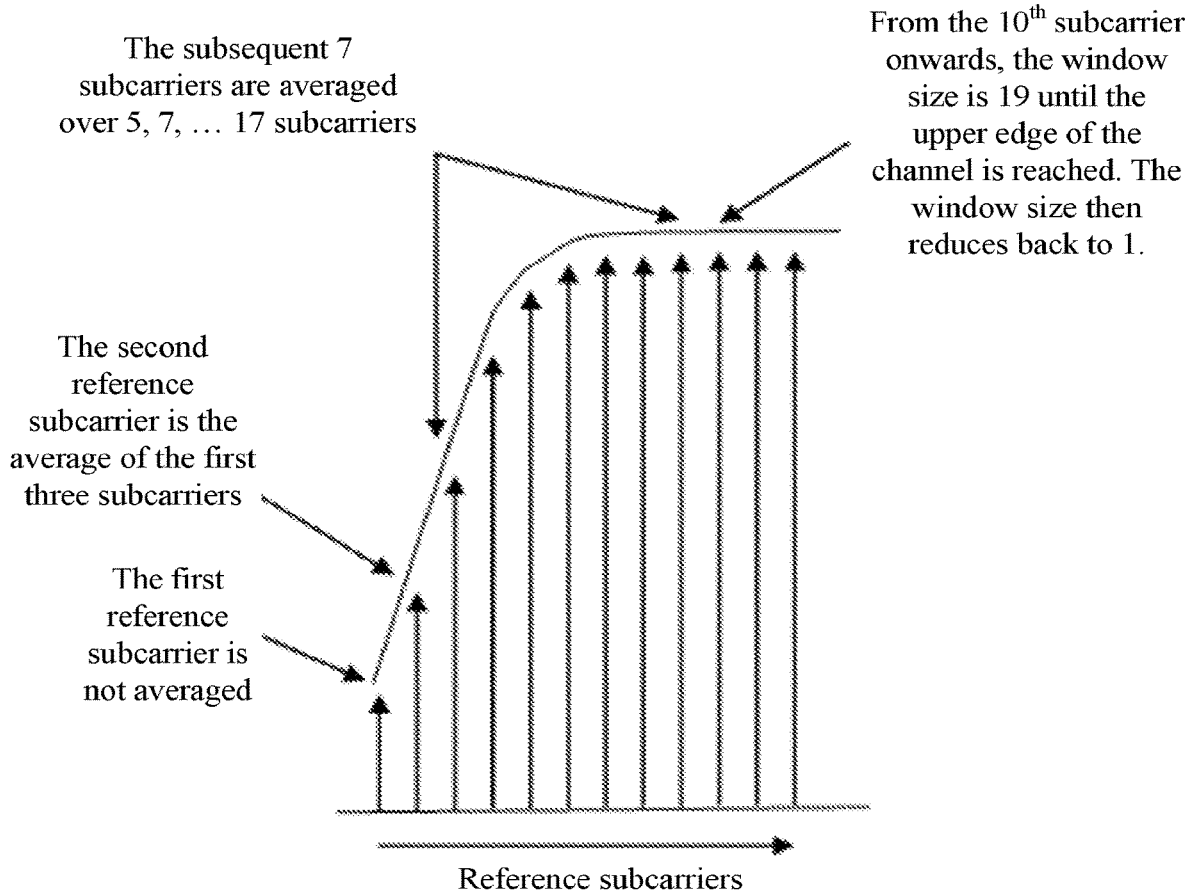
FIG. 1 illustrates an example of reference subcarrier smoothing in the frequency domain.
Figure 2:
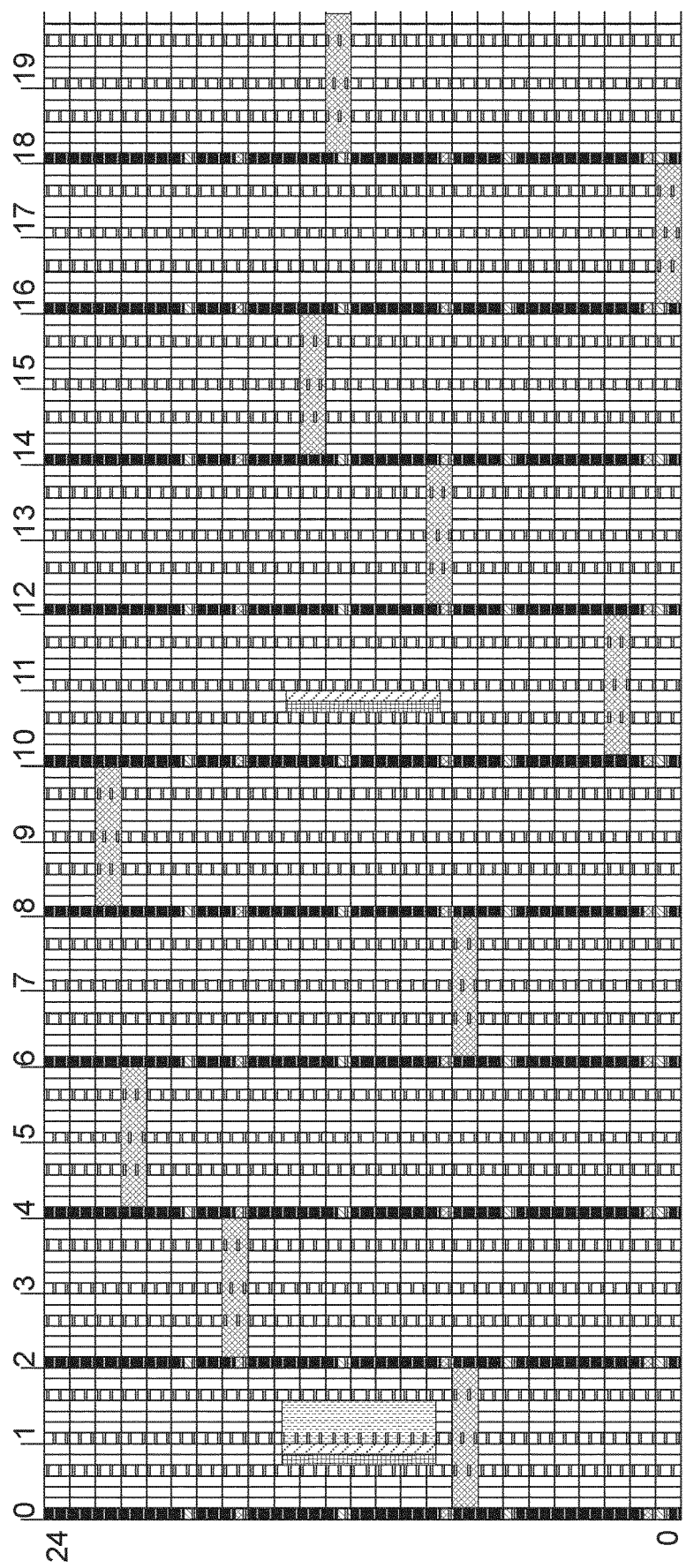
FIG. 2 illustrates an example of resource allocation in an Evolved Universal Terrestrial Access (E-UTRA) test model.

Moving averages may be used to obtain equalizer coefficients in the frequency domain across the subcarriers that contain DMRS. For example, as illustrated in FIG. 1, the equalizer coefficients for amplitude and phase $\hat{a}(f)$ and $\hat{\varphi}(f)$ at the DMRS subcarriers, which may be subcarriers configured to contain DMRS, may be obtained by computing the moving averages in the frequency domain of the time-averaged demodulation reference signal subcarriers. This may result in a moving average window, which is the number of time averaged DMRS subcarriers in the frequency domain configured to obtain equalizer coefficients. Here, an example of the moving average window size is 19. For reference subcarriers at or near the edge of the channel, the window size shrinks accordingly. As shown in FIG. 2, this technique may be suitable with E-UTRA signals since common reference signals (CRS) exist throughout the frequency domain, and rare cases which are illustrated in FIG. 1 exist only at or near the edge of the BS channel bandwidth.

Figure 3:
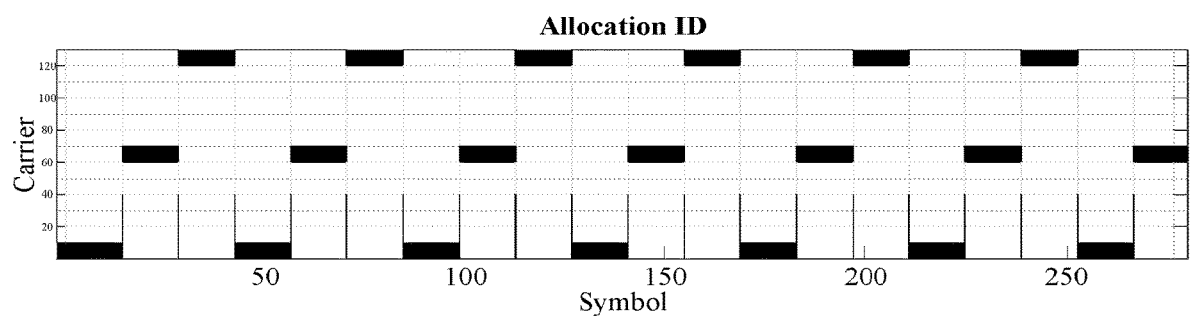
FIG. 3 illustrates an example of allocation in NR-frequency range (FR)1-test model (TM)2 5 MHz bandwidth 30 KHz subcarrier spacing (SCS).

However, no CRS exists in NR, and instances where PDSCH is not allocated contiguously throughout in the frequency domain creates large gaps between allocated PDSCHs. No DMRS subcarrier exists in these gaps since none is allocated. For example, FIG. 3 shows the resource allocation in NR test model 2 (in FR) with 5 MHz channel bandwidth and 30 MHz SCS, and non-contiguous resource block (RB) allocation throughout the frequency domain. As explained earlier, large gaps may occur in the frequency domain where there is no DMRS subcarrier of length 19 with moving averages to calculate equalizer coefficients. Doing so would generate gaps so large that it would be beneficial to instead provide each RB of PDSCH/physical downlink control channel (PDCCH) with a dedicated equalizer calculation. Otherwise, this would degrade the resulting EVM value due to inappropriate equalization with different characteristics of amplitude and phase across the large gaps in the frequency domain. It should be noted that, in FIG. 3, the 5 MHz channel bandwidth with 30 kHz SCS has the smallest gap in all NR test model, while the remaining cases worsen with larger distances between the allocated RBs.

In order to address this challenge, some proposals seek to modify the equalizer moving average calculation to accommodate these large gaps by modifying the channel edge exceptional cases to include these separately allocated RBs edges to use method illustrated in FIG. 1. For example, the equalizer coefficients for amplitude and phase $\hat{\alpha}(f)$ and $\hat{\phi}(f)$ at the DMRS subcarriers may be obtained by computing the moving average in the frequency domain of the time-averaged DMRS subcarriers, with the moving average window size again at 19. However, the channel window size may be reduced accordingly for reference subcarriers at or near the edge of a set of contiguously allocated RBs that contain DMRS on subcarriers, as per FIG. 1. However, this technique does not address how to reduce the moving average window size for DMRS subcarriers at or near the edge of a set of contiguously allocated RBs, nor whether to process allocated RBs at the channel bandwidth edges in the same way as other allocated RBs inside the channel bandwidth.

Figure 4:
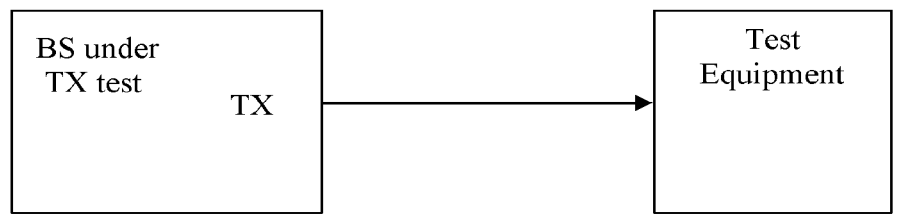
FIG. 4 illustrates an example of measuring a set-up for conducted error vector magnitude (EVM).
Figure 5:
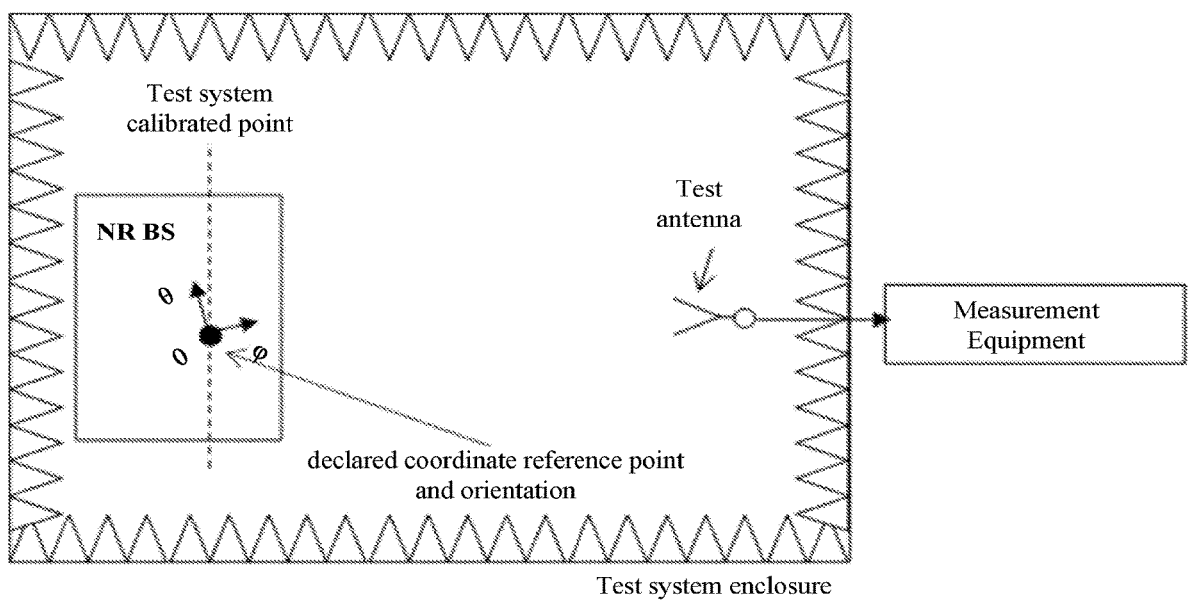
FIG. 5 illustrates an example of measurement set up for radiated EVM.

FIGS. 4 and 5 illustrate EVM measurement set-ups for conducted and over-the-air (OTA) requirements, respectively, as described in 3GPP TS 38.141-1 and TS 38.141-2. The dominant interference on the received signal in the measurement equipment in both conducted and radiated cases can include additive white Gaussian noise (AWGN). Averaging n AWGN samples may reduce the noise variances by a factor of n. Thus, the moving average may be applied to calculate the equalizer coefficients from the received noisy samples of the DMRS. Some embodiments described herein may also maximize the moving average window size if there are large gaps between the allocated RBs in the test model used for EVM measurements, and thus, each RB of PDSCH/PDCCH may be supported by dedicated equalizer calculations.

Figure 6:
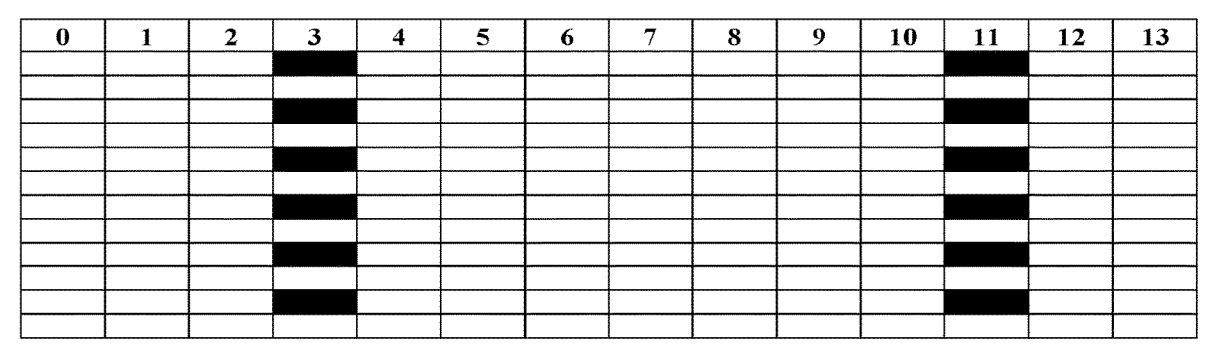

FIG. 6 illustrates a DMRS pattern for PDSCH EVM measurements in FR, where each the frequency domain of the allocated RB has 6 DMRS. Thus, there may be at most 6 DMRS samples for the moving average in the frequency domain if each PDSCH RB has its own equalizer calculation. All the available DMRS subcarriers in each PDSCH/PDCCH RB may be used for the moving average in the frequency domain if each RB of PDSCH/PDCCH has its own equalizer calculation, with the exception of DMRS subcarriers at or near the edge of the 2 RBs at the edges of the channel bandwidth. The window size may be reduced as shown in FIG. 1 as a result of power amplifier imperfection and filtering impact at the channel edges. This would result in a window size of 6 for each PDSCH RB, except the 2 RBs at the edges of the channel bandwidth. In various embodiments, the unit of window size is the number of time averaged DMRS subcarriers in the frequency domain.

As illustrated in FIG. 6, linear interpolation may be performed from the equalizer coefficients $\hat{\alpha}(f)$ and $\hat{\phi}(f)$ to compute coefficients $\alpha(f)$, $\phi(f)$ for each subcarrier. Since there are fewer equalizer coefficients if each RB of PDSCH/PDCCH has its own equalizer calculation, a higher order interpolation equation may be used to compute coefficients for each non-DMRS subcarrier. With linear interpolation comparison, a higher order interpolation equation may provide improve estimates for each non-DMRS subcarrier. For example, a $5^{th}$ order interpolation polynomial may be used with the 6 equalizer coefficients in each PDSCH RB to compute coefficients for each non-DMRS subcarrier.

Figure 7:
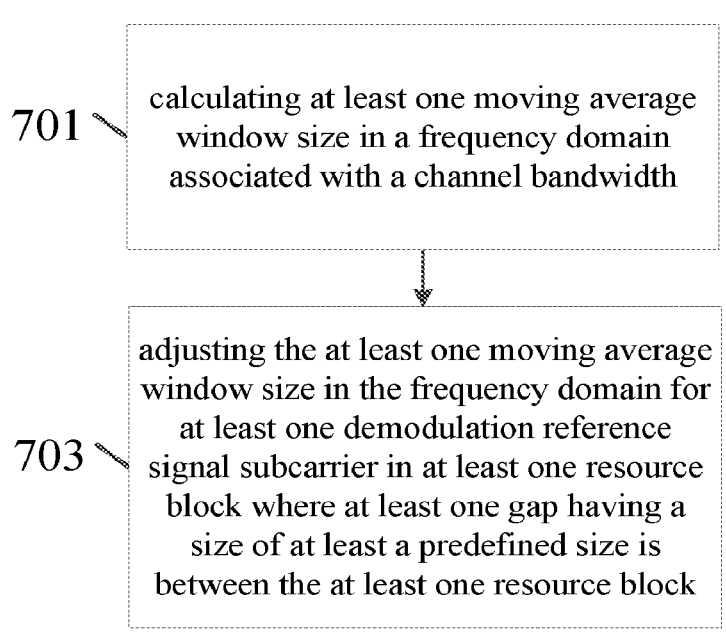
FIG. 7 illustrates an example of a flow diagram of a method according to some embodiments.
Figure 8:
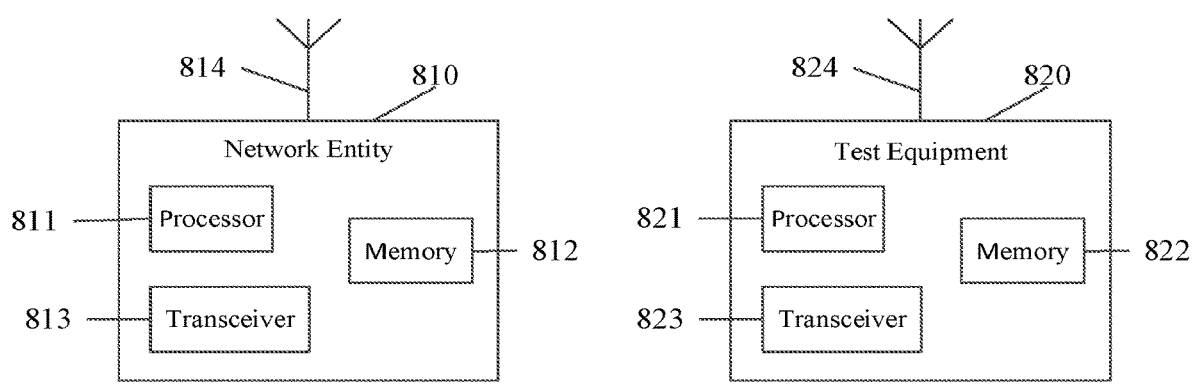
FIG. 8 illustrates an example of various network devices according to certain embodiments.

FIG. 7 illustrates an example of a flow diagram of a method that may be performed by a device, such as test equipment (TE) 810 or network entity (NE) 820, both illustrated in FIG. 8, according to certain embodiments. At 701, the device may calculate at least one moving average window size in frequency domain associated with a channel bandwidth. At 703, the device may adjust the at least one moving average window size in the frequency domain for at least one demodulation reference signal subcarrier in at least one resource block where at least one gap having a size of at least a predefined size is between the at least one resource block. The at least one resource block may comprise a predetermined number of demodulation reference signal subcarriers. The same technique can be applied to any number of DMRS subcarriers in each RB, wherein the size of an RB may be 6 consecutive subcarriers in the frequency domain.

In some embodiments, for at least one PDSCH resource block at the lower of edge of the channel bandwidth, such as the first RB inside the channel bandwidth, the moving average window size in the frequency domain is applied. The first DMRS subcarrier may not be averaged such that $y_1=DMRS_1$. The second DMRS subcarrier may be averaged over three DMRS subcarriers such that $$y_2 = \sum_{i=1}^{3} DMRS_i.$$

The third DMRS subcarrier may be averaged over five DMRS subcarriers such that $$y_3 = \sum_{i=1}^{5} DMRS_i.$$

The fourth DMRS subcarrier may be averaged over five DMRS subcarriers such that $$y_4 = \sum_{i=2}^{6} DMRS_i.$$

The fifth DMRS subcarrier may be averaged over five DMRS subcarriers such that $$y_5 = \sum_{i=2}^{6} DMRS_i.$$

The sixth DMRS subcarrier may be averaged over five DMRS subcarriers such that $$y_6 = \sum_{i=2}^{6} DMRS_i.$$

In certain embodiments, for at least one PDSCH resource block in the middle of the channel bandwidth, such as the RBs beside the first and the last RB inside the channel bandwidth, the moving average window size in the frequency domain may be applied. The first DMRS subcarrier may be averaged over 5 DMRS subcarriers such that $$y_2 = \sum_{i=1}^{5} DMRS_i.$$

The second DMRS subcarrier may be averaged over 5 DMRS subcarrier such that $$y_2 = \sum_{i=1}^{5} DMRS_i.$$

The third DMRS subcarrier may be averaged over 5 DMRS subcarriers such that $$y_3 = \sum_{i=1}^{5} DMRS_i.$$

The fourth DMRS subcarrier may be averaged over 5 DMRS subcarriers such that $$y_4 = \sum_{i=2}^{6} DMRS_i.$$

The fifth DMRS subcarrier may be averaged over 5 DMRS subcarriers such that $$y_5 = \sum_{i=2}^{6} DMRS_i.$$

The sixth DMRS subcarrier may be averaged over 5 DMRS subcarriers such that $$y_6 = \sum_{i=2}^{6} DMRS_i.$$

In various embodiments, for at least one PDSCH resource block at the upper edge of the channel bandwidth, such as the last RB inside the channel bandwidth, the moving average window size in the frequency domain may be applied. The first DMRS subcarrier may be averaged over five DMRS subcarriers such that $$y_1 = \sum_{i=1}^{5} DMRS_i.$$

The second DMRS subcarrier may be averaged over five DMRS subcarriers such that $$y_2 = \sum_{i=1}^{5} DMRS_i.$$

The third DMRS subcarrier may be averaged over five DMRS subcarriers such that $$y_3 = \sum_{i=1}^{5} DMRS_i.$$

The fourth DMRS subcarrier may be averaged over five DMRS subcarriers such that $$y_4 = \sum_{i=2}^{6} DMRS_i.$$

The fifth DMRS subcarrier may be averaged over three DMRS subcarriers such that $$y_5 = \sum_{i=4}^{6} DMRS_i.$$

The sixth DMRS subcarrier may not be averaged such that $y_6 = DMRS_6$.

In some embodiments, the method may further include calculating at least one coefficient for each non-demodulation reference signal subcarrier x according to a fifth order interpolation polynomial with six equalizer coefficients in each PDSCH resource block. The calculating may be performed according to $$y(x) = \sum_{j=1}^{6} y_j \prod_{\substack{k=1 \\ k \neq j}}^{6} \frac{x - x_k}{x_j - x_k}.$$

In certain embodiments, the method may further include calculating at least one coefficient for each non-demodulation reference signal subcarrier x according to a fourth order interpolation polynomial with the five equalizer coefficients closest to the target non-demodulation reference signal subcarrier x in the frequency domain in each PDSCH resource block. The calculating is performed according to $$y(x) = \sum_{j=1}^{5} y_j \prod_{\substack{k=1 \\ k \neq j}}^{5} \frac{x - x_k}{x_j - x_k}.$$

In various embodiments, the method may include calculating at least one coefficient for each non-demodulation reference signal subcarrier x according to a third order interpolation polynomial with the four equalizer coefficients closest to the target non-demodulation reference signal subcarrier x in the frequency domain in each PDSCH resource block. The calculating may be performed according to $$y(x) = \sum_{j=1}^{3} y_j \prod_{\substack{k=1 \\ k \neq j}}^{3} \frac{x - x_k}{x_j - x_k}.$$

In some embodiments, the method may further include calculating at least one coefficient for each non-demodulation reference signal subcarrier x according to a second order interpolation polynomial with the three equalizer coefficients closest to the target non-demodulation reference signal subcarrier x in the frequency domain in each PDSCH resource block. The calculating may be performed according to $$y(x) = \sum_{j=1}^{2} y_j \prod_{\substack{k=1 \\ k \neq j}}^{5} \frac{x - x_k}{x_j - x_k}.$$

FIG. 8 illustrates an example of a system according to certain example embodiments. In one example embodiment, a system may include multiple devices, such as, for example, network entity 810 and/or test equipment 820.

Network entity 810 may be one or more of a base station, such as an evolved node B (eNB) or 5G or New Radio node B (gNB), a serving gateway, a server, and/or any other access node or combination thereof.

Network entity 810 may further comprise at least one gNB-CU, which may be associated with at least one gNB-DU. The at least one gNB-CU and at least one gNB-DU may be in communication via at least one F1 interface, at least one $X_n$-C interface, and/or at least one NG interface via a 5GC.

Test equipment 820 may include one or more of a mobile device, such as a mobile phone, smart phone, personal digital assistant (FDA), tablet, or portable media player, digital camera, pocket video camera, video game console, navigation unit, such as a global positioning system (GPS) device, desktop or laptop computer, single-location device, such as a sensor or smart meter, or any combination thereof.

One or more of these devices may include at least one processor, respectively indicated as 811 and 821. Processors 811 and 821 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 812 and 822. The memory may be fixed or removable. The memory may include computer program instructions or computer code contained therein. Memories 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 811 and 821 and memories 812 and 822 or a subset thereof, may be configured to provide means corresponding to the various blocks of FIGS. 1-7. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 8, transceivers 813 and 823 may be provided, and one or more devices may also include at least one antenna, respectively illustrated as 814 and 824. The device may have many antennas, such as an array of antennas configured for multiple input multiple output (MIMO) communications, or multiple antennas for multiple radio access technologies. Other configurations of these devices, for example, may be provided. Transceivers 813 and 823 may be a transmitter, a receiver, or both a transmitter and a receiver, or a unit or device that may be configured both for transmission and reception.

The memory and the computer program instructions may be configured, with the processor for the particular device, to cause a hardware apparatus such as test equipment to perform any of the processes described below (see, for example, FIGS. 1-7). Therefore, in certain embodiments, a non-transitory computer-readable medium may be encoded with computer instructions that, when executed in hardware, perform a process such as one of the processes described herein. Alternatively, certain embodiments may be performed entirely in hardware In certain embodiments, an apparatus may include circuitry configured to perform any of the processes or functions illustrated in FIGS. 1-7. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Figure 9:
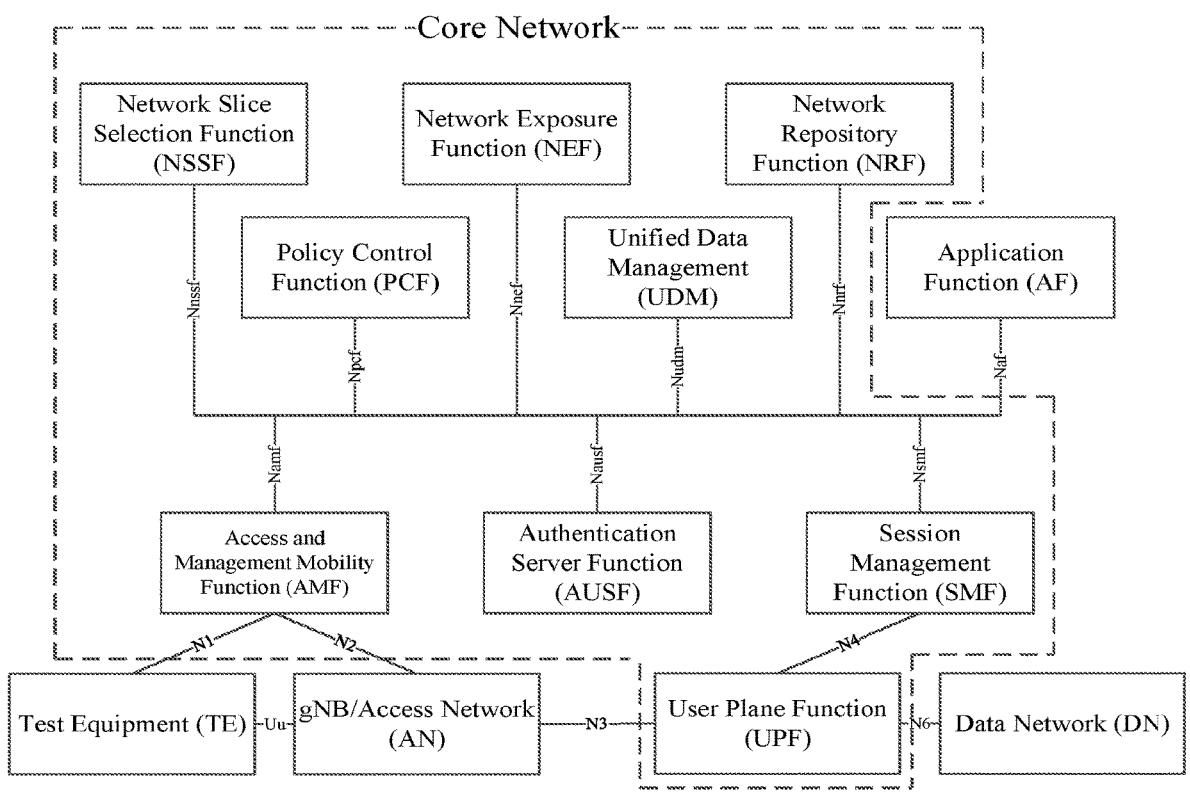
FIG. 9 illustrates an example of a 5G network and system architecture according to certain embodiments.

FIG. 9 illustrates an example of a 5G network and system architecture according to certain embodiments. Shown are multiple network functions that may be implemented as software operating as part of a network device or dedicated hardware, as a network device itself or dedicated hardware, or as a virtual function operating as a network device or dedicated hardware. The NE and TE illustrated in FIG. 9 may be similar to NE 810 and TE 820, respectively. The UPF may provide services such as intra-RAT and inter-RAT mobility, routing and forwarding of data packets, inspection of packets, user plane QoS processing, buffering of downlink packets, and/or triggering of downlink data notifications. The AF may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

3GPP Third Generation Partnership Project
   5G Fifth Generation
   5GC Fifth Generation Core
   5GS Fifth Generation System
   5QI Fifth Generation Quality of Service Indicator
   AMF Access and Mobility Management Function
   ASIC Application Specific Integrated Circuit
   AWGN Additive White Gaussian Noise
   BS Base Station
   BW Bandwidth
   CN Core Network
   CRS Common Reference Signal
   CPU Central Processing Unit
   DMRS Demodulation Reference Signal
   eMBB Enhanced Mobile Broadband
   eMTC Enhanced Machine Type Communication
   eNB Evolved Node B
   EPS Evolved Packet System
   E-UTRA Evolved Universal Terrestrial Access
   EVM Error Vector Magnitude
   FR Frequency Range
   gNB Next Generation Node B
   GPS Global Positioning System
   HDD Hard Disk Drive
   IEEE Institute of Electrical and Electronics Engineers
   LTE Long-Term Evolution
   MAC Medium Access Control
   MCS Modulation and Coding Scheme
   MEMS Micro Electrical Mechanical System
   MIB Master Information Block
   MIMO Multiple Input Multiple Output
   MME Mobility Management Entity
   MTC Machine Type Communication
   NAS Non-Access Stratum
   NE Network Entity
   NG Next Generation
   NR New Radio
   NR-U New Radio Unlicensed
   OTA Over-the-Air
   FDA Personal Digital Assistance
   PDCCH Physical Downlink Control Channel
   PDSCH Physical Downlink Shared Channel
   PDU Protocol Data Unit
   PHY Physical
   PRACH Physical Random Access Channel
   PUCCH Physical Uplink Control Channel
   PUSCH Physical Uplink Shared Channel
   RAM Random Access Memory
   RAN Radio Access Network
   RAN4 Radio Access Network Working Group 4
   RB Resource Block
   RLC Radio Link Control
   RRC Radio Resource Control
   SCS Subcarrier Spacing
   SMF Session Management Function
   TM Test Model
   TR Technical Report
   TS Technical Specification
   TE Test Equipment
   TTI Transmission Time Interval
   Tx Transmission
   UE User Equipment
   UL Uplink
   URLLC Ultra-Reliable and Low-Latency Communication
   WLAN Wireless Local Area Network According to a first embodiment, a method may include calculating at least one moving average window size in a frequency domain associated with a channel bandwidth and adjusting the at least one moving average window size in the frequency domain for at least one demodulation reference signal subcarrier in at least one resource block where at least one gap having a size of at least a predefined size is between the at least one resource block, wherein the at least one resource block comprises a predetermined number of demodulation reference signal subcarriers. The at least one resource block may comprise a predetermined number of demodulation reference signal subcarriers.

In a variant, for at least one physical downlink shared channel resource block at the lower edge of the channel bandwidth, the at least one moving average window size in the frequency domain is applied. A first demodulation reference signal subcarrier may not be averaged such that $y_1 = DMRS_1$. A second demodulation reference signal subcarrier may be averaged over three demodulation reference signal subcarriers such that $$y_2 = \sum_{i=1}^{5} DMRS_i.$$

A third demodulation reference signal subcarrier may be averaged over five demodulation reference signal subcarriers such that $$y_3 = \sum_{i=1}^{5} DMRS_i.$$

A fourth demodulation reference signal subcarrier may be averaged over five demodulation reference signal subcarriers such that $$y_4 = \sum_{i=2}^{6} DMRS_i.$$

A fifth demodulation reference signal subcarrier may be averaged over five demodulation reference signal subcarriers such that $$y_5 = \sum_{i=2}^{6} DMRS_i.$$

A sixth demodulation reference signal subcarrier may be averaged over five demodulation reference signal subcarriers such that $$y_6 = \sum_{i=2}^{6} DMRS_i.$$

In a variant, for at least one physical downlink shared channel resource block in the middle of the channel bandwidth, the at least one moving average window size in the frequency domain may be applied. A first demodulation reference sign subcarrier may be averaged over 5 demodulation reference signal subcarriers such that $$y_2 = \sum_{i=1}^{5} DMRS_i.$$

A second demodulation reference signal subcarrier may be averaged over 5 demodulation reference signal subcarrier such that $$y_2 = \sum_{i=1}^{5} DMRS_i.$$

A third demodulation reference signal subcarrier may be averaged over 5 demodulation reference signal subcarriers such that $$y_3 = \sum_{i=1}^{5} DMRS_i.$$

A fourth demodulation reference signal subcarrier may be averaged over 5 demodulation reference signal subcarriers such that $$y_4 = \sum_{i=2}^{6} DMRS_i.$$

A fifth demodulation reference signal subcarrier may be averaged over 5 demodulation reference signal subcarriers such that $$y_5 = \sum_{i=2}^{6} DMRS_i.$$

A sixth demodulation reference signal subcarrier may be averaged over 5 demodulation reference signal subcarriers such that $$y_6 = \sum_{i=2}^{6} DMRS_i.$$

In a variant, for at least one physical downlink shared channel resource block at the upper edge of the channel bandwidth, the at least one moving average window size in the frequency domain may be applied. A first demodulation reference signal subcarrier is averaged over five demodulation reference signal subcarriers such that $$y_1 = \sum_{i=1}^{5} DMRS_i.$$

A second demodulation reference signal subcarrier is averaged over five demodulation reference signal subcarriers such that $$y_2 = \sum_{i=1}^{5} DMRS_i.$$

A third demodulation reference signal subcarrier is averaged over five demodulation reference signal subcarriers such that $$y_3 = \sum_{i=1}^{5} DMRS_i.$$

A fourth demodulation reference signal subcarrier is averaged over five demodulation reference signal subcarriers such that $$y_4 = \sum_{i=2}^{6} DMRS_i.$$

A fifth demodulation reference signal subcarrier is averaged over three demodulation reference signal subcarriers such that $$y_5 = \sum_{i=4}^{6} DMRS_i.$$

A sixth demodulation reference signal subcarrier is not averaged such that $y_6 = DMRS_6$.

In a variant, the method may further include calculating at least one coefficient for each non-demodulation reference signal subcarrier x according to a fifth order interpolation polynomial with six equalizer coefficients in each physical downlink shared channel resource block. The calculating may be performed according to $$y(x) = \sum_{j=1}^{6} y_j \prod_{\substack{k=1 \\ k \neq j}}^{5} \frac{x - x_k}{x_j - x_k}.$$

In a variant, the method may further include calculating at least one coefficient for each non-demodulation reference signal subcarrier x according to a fourth order interpolation polynomial with the five equalizer coefficients closest to the target non-demodulation reference signal subcarrier x in the frequency domain in each physical downlink shared channel resource block. The calculating is performed according to $$y(x) = \sum_{j=1}^{5} y_j \prod_{\substack{k=1 \\ k \neq j}}^{5} \frac{x - x_k}{x_j - x_k}.$$

In a variant, the method may include calculating at least one coefficient for each non-demodulation reference signal subcarrier x according to a third order interpolation polynomial with the four equalizer coefficients closest to the target non-demodulation reference signal subcarrier x in the frequency domain in each physical downlink shared channel resource block. The calculating may be performed according to $$y(x) = \sum_{j=1}^{3} y_j \prod_{\substack{k=1 \\ k \neq j}}^{3} \frac{x - x_k}{x_j - x_k}.$$

In a variant, the method may further include calculating at least one coefficient for each non-demodulation reference signal subcarrier x according to a second order interpolation polynomial with the three equalizer coefficients closest to the target non-demodulation reference signal subcarrier x in the frequency domain in each physical downlink shared channel resource block. The calculating may be performed according $$y(x) = \sum_{j=1}^{2} y_j \prod_{\substack{k=1 \\ k \neq j}}^{2} \frac{x - x_k}{x_j - x_k}.$$

According to a second embodiment, an apparatus can include at least one processor and at least one memory and computer program code. The at least one memory and the computer program code can be configured to, with the at least one processor, cause the apparatus at least to perform a method according to the first embodiment and any of its variants.

According to a third embodiment, an apparatus can include means for performing the method according to the first embodiment and any of its variants.

According to a fourth embodiment, a computer program product may encode instructions for performing a process including a method according to the first embodiment and any of its variants.

According to a fifth embodiment, a non-transitory computer-readable medium may encode instructions that, when executed in hardware, perform a process including a method according to the first embodiment and any of its variants.

According to a sixth embodiment, a computer program code may include instructions for performing a method according to the first embodiment and any of its Variants.

According to a seventh embodiment, an apparatus may include circuitry configured to perform a process including a method according to the first embodiment and any of its variants.

We claim:

1. A method for supporting communication, comprising:
    adjusting, by an apparatus, at least one moving average window size for demodulation reference signal, (DMRS) subcarriers in at least one resource block of a channel bandwidth; and
    applying, by the apparatus, the adjusted at least one moving average window size to the DMRS subcarriers when the at least one resource block is at or beside an edge of the channel bandwidth,
    wherein at least one of a first DMRS subcarrier, a second DMRS subcarrier or a third DMRS subcarrier of the DMRS subcarriers is averaged over 5 DMRS subcarriers if one of the adjusted at least one moving average window size is 5,
    wherein at least one of a fourth DMRS subcarrier, a fifth DMRS subcarrier or a sixth DMRS subcarrier of the DMRS subcarriers is averaged over 5 DMRS subcarriers, if one of the adjusted at least one moving average window size is 5, and
    wherein the at least one resource block comprises a predetermined number of DMRS subcarriers.

2. The method of claim 1, wherein the predetermined number of DMRS subcarriers is six.

3. The method of claim 1, wherein at least one of the first DMRS subcarrier, the second DMRS subcarrier or the third DMRS subcarrier of the DMRS subcarriers is averaged over 5 DMRS subcarriers from the first DMRS subcarrier to a fifth DMRS subcarrier of the DMRS subcarriers, and
    wherein at least one of the fourth DMRS subcarrier, the fifth DMRS subcarrier or the sixth DMRS subcarrier of the DMRS subcarriers is averaged over 5 DMRS subcarriers from the second DMRS subcarrier to the sixth DMRS subcarrier of the DMRS subcarriers.

4. The method of claim 1, further comprising:
    calculating, by the apparatus, at least one coefficient for at least one non-DMRS subcarrier x according to a fifth order interpolation polynomial with six equalizer coefficients in at least one physical downlink shared channel resource block, wherein:

$$y(x) = \sum_{j=1}^{6} y_j \prod_{\substack{k=1 \\ k \neq j}}^{6} \frac{x - x_k}{x_j - x_k}.$$

5. The method of claim 1 further comprising:
    calculating, by the apparatus, at least one coefficient for at least one non-DMRS subcarrier x according to a fourth order interpolation polynomial with five equalizer coefficients closest to a target non-demodulation reference signal subcarrier in the frequency domain in at least one physical downlink shared channel resource block, wherein:

$$y(x) = \sum_{j=1}^{5} y_j \prod_{\substack{k=1 \\ k \neq j}}^{5} \frac{x - x_k}{x_j - x_k}.$$

6. An apparatus, comprising:
    at least one processor; and
    at least one memory including instructions,
    the at least one memory and the instructions configured to, with the at least one processor, cause the apparatus at least to:
    adjust at least one moving average window size for demodulation reference signal, DMRS, subcarriers in at least one resource block of a channel bandwidth; and
    apply the adjusted at least one moving average window size to the DMRS subcarriers when the at least one resource block is at or beside an edge of the channel bandwidth,
    wherein at least one of a first DMRS subcarrier, a second DMRS subcarrier or a third DMRS subcarrier of the DMRS subcarriers is averaged over 5 DMRS subcarriers if one of the adjusted at least one moving average window size is 5,
    wherein at least one of a fourth DMRS subcarrier, a fifth DMRS subcarrier or a sixth DMRS subcarrier of the DMRS subcarriers is averaged over 5 DMRS subcarriers, if one of the adjusted at least one moving average window size is 5, and
    wherein the at least one resource block comprises a predetermined number of DMRS subcarriers.

7. The apparatus of claim 6, wherein the predetermined number of DMRS subcarriers is six.

8. The apparatus of claim 6, wherein at least one of the first DMRS subcarrier, the second DMRS subcarrier or the third DMRS subcarrier of the DMRS subcarriers is averaged over 5 DMRS subcarriers from the first DMRS subcarrier to a fifth DMRS subcarrier of the DMRS subcarriers, and
    wherein at least one of the fourth DMRS subcarrier, the fifth DMRS subcarrier or the sixth DMRS subcarrier of the DMRS subcarriers is averaged over 5 DMRS subcarriers from the second DMRS subcarrier to the sixth DMRS subcarrier of the DMRS subcarriers.

9. The apparatus of claim 6, wherein the at least one memory and the instructions configured to, with the at least one processor, further cause the apparatus to:
    calculate at least one coefficient for at least one non-DMRS subcarrier x according to a fifth order interpolation polynomial with six equalizer coefficients in at least one physical downlink shared channel resource block, wherein:

$$y(x) = \sum_{j=1}^{6} y_j \prod_{\substack{k=1 \\ k \neq j}}^{6} \frac{x - x_k}{x_j - x_k}.$$

10. The apparatus of claim 6, wherein the at least one memory and the instructions configured to, with the at least one processor, further cause the apparatus to:
calculate at least one coefficient for at least one non-DMRS subcarrier x according to a fourth order interpolation polynomial with five equalizer coefficients closest to a target non-DMRS subcarrier in the frequency domain in at least one physical downlink shared channel resource block, wherein:

$$y(x) = \sum_{j=1}^{5} y_j \prod_{\substack{k=1 \\ k \neq j}}^{5} \frac{x - x_k}{x_j - x_k}.$$

11. A non-transitory computer readable medium comprising instructions that, when executed by an apparatus, cause the apparatus to perform at least the following:
adjusting at least one moving average window size for demodulation reference signal, DMRS, subcarriers in at least one resource block of a channel bandwidth; and
applying the adjusted at least one moving average window size to the DMRS subcarriers when the at least one resource block is at or beside an edge of the channel bandwidth,
wherein at least one of a first DMRS subcarrier, a second DMRS subcarrier or a third DMRS subcarrier of the DMRS subcarriers is averaged over 5 DMRS subcarriers if one of the adjusted at least one moving average window size is 5,
wherein at least one of a fourth DMRS subcarrier, a fifth DMRS subcarrier or a sixth DMRS subcarrier of the DMRS subcarriers is averaged over 5 DMRS subcarriers, if one of the adjusted at least one moving average window size is 5, and
wherein the at least one resource block comprises a predetermined number of DMRS subcarriers.

12. The non-transitory computer readable medium of claim 11, wherein the predetermined number of DMRS subcarriers is six.

13. The non-transitory computer readable medium of claim 11, wherein at least one of the first DMRS subcarrier, the second DMRS subcarrier or the third DMRS subcarrier of the DMRS subcarriers is averaged over 5 DMRS subcarriers from the first DMRS subcarrier to a fifth DMRS subcarrier of the DMRS subcarriers, and
wherein at least one of the fourth DMRS subcarrier, the fifth DMRS subcarrier or the sixth DMRS subcarrier of the DMRS subcarriers is averaged over 5 DMRS subcarriers from the second DMRS subcarrier to the sixth DMRS subcarrier of the DMRS subcarriers.

14. The non-transitory computer readable medium of claim 11, wherein the non-transitory computer readable medium further comprises instructions that, when executed by an apparatus, cause the apparatus to perform at least the following:
calculating at least one coefficient for at least one non-DMRS subcarrier x according to a fifth order interpolation polynomial with six equalizer coefficients in at least one physical downlink shared channel resource block, wherein:

$$y(x) = \sum_{j=1}^{6} y_j \prod_{\substack{k=1 \\ k \neq j}}^{6} \frac{x - x_k}{x_j - x_k}.$$

15. The non-transitory computer readable medium of claim 11, wherein the non-transitory computer readable medium further comprises instructions that, when executed by an apparatus, cause the apparatus to perform at least the following:
calculating at least one coefficient for at least one non-DMRS subcarrier x according to a fourth order interpolation polynomial with five equalizer coefficients closest to a target non-demodulation reference signal subcarrier in the frequency domain in at least one physical downlink shared channel resource block, wherein:

$$y(x) = \sum_{j=1}^{5} y_j \prod_{\substack{k=1 \\ k \neq j}}^{5} \frac{x - x_k}{x_j - x_k}.$$

\* \* \* \* \*